(12) United States Patent
Takeuchi et al.

(10) Patent No.: US 6,502,989 B1
(45) Date of Patent: Jan. 7, 2003

(54) DYNAMIC PRESSURE BEARING AND SPINDLE MOTOR WITH THE BEARING

(75) Inventors: Hisao Takeuchi, Itami (JP); Kaoru Murabe, Itami (JP); Makoto Otsuki, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/743,136

(22) PCT Filed: May 2, 2000

(86) PCT No.: PCT/JP00/02888

§ 371 (c)(1),
(2), (4) Date: Mar. 19, 2001

(87) PCT Pub. No.: WO00/68586

PCT Pub. Date: Nov. 16, 2000

(30) Foreign Application Priority Data

May 17, 1999 (JP) ............................................. 11-127143

(51) Int. Cl.⁷ ............................................. F16C 32/06
(52) U.S. Cl. ........................................ 384/100; 384/107
(58) Field of Search ................................ 384/100, 107, 384/111, 113, 121, 114, 115, 118

(56) References Cited

U.S. PATENT DOCUMENTS

| | | | |
|---|---|---|---|
| 4,487,514 A | * 12/1984 | Mori ........................... | 384/113 |
| 4,547,081 A | * 10/1985 | Tanaka et al. ............... | 384/107 |
| 4,798,476 A | * 1/1989 | Sakatani et al. ............. | 384/108 |
| 4,805,972 A | 2/1989 | Tanaka et al. ............... | 350/6.7 |
| 4,934,836 A | * 6/1990 | Tanaka et al. ............... | 384/107 |
| 5,018,881 A | * 5/1991 | Asada ......................... | 384/100 |
| 5,097,164 A | * 3/1992 | Nakasugi et al. ........... | 384/114 |
| 5,370,463 A | * 12/1994 | Asada et al. ................. | 384/113 |
| 5,715,116 A | * 2/1998 | Moritan et al. ............. | 384/107 |

FOREIGN PATENT DOCUMENTS

| | | |
|---|---|---|
| JP | 58-92516 | 6/1983 |
| JP | 58-134217 | 8/1983 |
| JP | 58-172115 | 11/1983 |
| JP | 59-68716 | 4/1984 |
| JP | 59-72956 | 4/1984 |
| JP | 1-206111 | 8/1989 |
| JP | 2-159412 | 6/1990 |
| JP | 9-222119 | 8/1997 |

* cited by examiner

Primary Examiner—Thomas R. Hannon
(74) Attorney, Agent, or Firm—McDermott, Will & Emery

(57) ABSTRACT

To provide a hydrodynamic bearing, small in size and light in weight, and yet simple in structure and inexpensive in cost, which can exhibits a sufficient rigidity. The bearing is structured so as to comprise a radial bearing portion including a groove 26 capable of introducing fluid such as air, and a thrust bearing portion whose one end is connected with the radial bearing portion and whose other end is open to the outside, whereas the structure guides a fluid introduced at the radial bearing portion to the thrust bearing portion and utilizes a pressure at the thrust bearing portion, thereby obtaining a stable thrust force without separately disposing a thrust hydrodynamic pressure generating mechanism. The fluid introduced to the thrust bearing portion is thereafter discharged through an opening 28 linked with outside. The surface area size of the groove 26 is preferably 40% or less to the surface area size of the radial bearing portion as a whole, and the number of such grooves is preferably six or smaller. Where the shape of the groove is an asymmetric shape that the depth is deep in an upstream portion of an airflow but shallow in a downstream portion (aft side), the radial bearing portion and the thrust bearing portion are improved in rigidity.

23 Claims, 4 Drawing Sheets

DYNAMIC PRESSURE BEARING AND SPINDLE MOTOR WITH THE BEARING

FIELD OF THE INVENTION

The present invention relates to a hydrodynamic bearing, and more particularly, to a hydrodynamic bearing comprising a radial bearing portion and a thrust bearing portion. The present invention also relates to a spindle motor comprising the hydrodynamic bearing.

BACKGROUND OF THE INVENTION

A small and light-weight spindle motor having a high rotation accuracy is used for a storage apparatus such as a hard disk, or a drive apparatus for a polygon mirror of a bar code scanner, etc. Since hydrodynamic gas bearings or hydrodynamic fluid (oil) bearings have simple structures and demonstrate stable bearing functions, it is known that these various types of hydrodynamic bearings are used for spindle motors. FIG. 7 shows an example of a hydrodynamic bearing disclosed in Japanese Patent Kokai (A) Publication No. 55918/1999. Referring to FIG. 7, a shaft 2 is fixed to a housing 1, and a rotor 3 is fitted on an outer circumferential surface of the shaft 2 such that the rotor 3 freely rotates. A stator 4 which forms an electro-magnet is attached to the outer circumferential surface of the shaft 2, and a rotor magnet 5 is attached to an inner circumferential surface of the rotor 3 which is faced with the stator 4. As a coil wound around the stator 4 is energized, drive force induced by attraction/repellence force is developed between the stator 4 and the rotor magnet 5, which in turn rotates the rotor 3 relative to the shaft 2 in the example shown in FIG. 7.

Radial hydrodynamic pressure generation elements 7 and 8 are attached, in a mutually opposed location, to the outer circumferential surface of the shaft 2 and the inner circumferential surface of the rotor 3, respectively, and relative rotation of these two generates a radial hydrodynamic pressure. Further, thrust hydrodynamic pressure generation elements 9 and 10 are attached, in a mutually opposed position, to the housing 1 and the rotor 3, respectively. A groove or grooves for generating a thrust hydrodynamic pressure are formed in either one of the mutually opposed surfaces 9 and 10, and a thrust hydrodynamic pressure is generated as the rotor 3 rotates. As a result, the rotor 3 is lifted up relative to the housing 1 and the rotor 3 rotates in a non-contact condition.

However, in the hydrodynamic bearing disclosed in Japanese Patent Kokai (A) Application No. 55918/1999, the thrust hydrodynamic pressure generation elements 9 and 10 relatively rotate in contact condition with each other until a sufficient thrust hydrodynamic pressure is generated after the rotor 3 starts to rotate from a halt state. Hence, there exists a problem that friction is created between the thrust hydrodynamic pressure generation elements 9 and 10 and the durability is accordingly deteriorated. The groove for generating a thrust hydrodynamic pressure usually has a spiral shape and it is formed by means of etching or laser engraving, and therefore, involves a high production cost problem.

To solve the problem of contact rotation as described above, Japanese Patent Kokai (A) Application 69715/1999 discloses a hydrodynamic bearing structured as shown in FIG. 8. In FIG. 8, the like elements as those in FIG. 7 bear the like reference numerals. A shaft 12 is fixed to a housing 11, and a hollow cylindrical rotor 13 with a blocked end on one side is fitted on an outer circumferential surface of the shaft 12. Drive force for a motor is obtained between a rotor magnet 5 fixed to an outer circumferential surface of the rotor 13 and a stator 4 disposed to the housing 11 facing the rotor magnet 5. As the rotor 13 rotates, a radial hydrodynamic pressure is generated between the outer circumferential surface of the shaft 12 and an inner circumferential surface of the rotor 13. A herringbone-shaped groove is formed on the outer circumferential surface of the shaft 12. As air introduced by the groove is guided to an upper portion of the rotor 13 having the blocked end and applies a pressure around this portion, the rotor 13 is lifted up. On the other hand, a ring-shaped thrust bearing member 14 is disposed to an outer peripheral portion of the rotor 13, while a thrust retaining member 15 is disposed to the housing 11, opposed with the thrust bearing member 14. As the rotor 13 is lifted up by the pressure of the introduced air, the thrust bearing member 14 moves close to the thrust retaining member 15. This develops a thrust hydrodynamic pressure between the two members which are brought close to each other, whereby the rotor 13 is maintained at a predetermined height at which the thrust hydrodynamic pressure balances with the pressure of the air described above and hence smoothly rotates in a non-contact condition.

Although the bearing structured as disclosed in Japanese Patent Kokai (A) Application No. 69715/1999 can avoid contact friction between the thrust hydrodynamic pressure generation elements 9 and 10 after the start of rotation, it is necessary to additionally dispose the thrust bearing member 14 and the thrust retaining member 15. This makes the structure of the bearing complex and increases the size and the weight.

Accordingly, an object of the present invention is to provide a hydrodynamic bearing having a small size and a light weight with low cost, and exhibiting a high rigidity despite a simple structure, which can solves the problem as described above associated with the prior art. An object of the present invention is also to provide a reliable spindle motor comprising such a hydrodynamic bearing.

SUMMARY OF THE INVENTION

According to the present invention, gas introduced at a radial bearing portion of a bearing is guided to a thrust bearing portion which is connected with the radial bearing portion, and the pressure of the introduced gas is used as a pressure for the thrust bearing portion. Hence, it is possible to obtain stable thrust force with a simple structure, without separately disposing a mechanism for generating a thrust hydrodynamic pressure. The present invention specifically includes the following.

That is, one aspect of the present invention relates to a hydrodynamic bearing comprising a radial bearing portion and a thrust bearing portion, which is characterized in that a groove or grooves capable of introducing fluid are formed on either one of surfaces opposed with each other at the radial bearing portion, and one end of the thrust bearing portion is connected with the radial bearing portion, and the other end of the thrust bearing portion is open to the outside atmosphere.

Another aspect of the present invention relates to a hydrodynamic bearing, wherein the groove or grooves exert a function of guiding the fluid introduced at the radial bearing portion to the thrust bearing portion connected with the radial bearing portion.

Yet another aspect of the present invention relates to a hydrodynamic bearing comprising a column-like shaft, and a hollow cylindrical sleeve whose one end is open to the outside and other end has a blocked surface, which sleeve is fitted on an outer circumferential surface of the shaft so as to accomplish relative rotation among the two, which is characterized in that in a radial bearing portion formed by the outer circumferential surface of the shaft and an inner circumferential surface of the sleeve which are faced with each other, a groove or grooves capable of introducing fluid are formed on either one of the outer circumferential surface of the shaft and the inner circumferential surface of the sleeve; in a thrust bearing portion formed by one end surface of the shaft in the axial direction and the blocked surface of the sleeve which are faced with each other, at least one opening capable of discharging the introduced fluid to outside atmosphere is formed either in the shaft or the sleeve; and the thrust bearing portion is formed contiguous to the radial bearing portion.

Yet another aspect of the present invention relates to a hydrodynamic bearing comprising a column-like shaft, and a hollow cylindrical sleeve whose one end is open and other end has a thrust surface which expands toward outside in the radius direction, which sleeve is fitted on an outer circumferential surface of the shaft so as to accomplish relative rotation among the two, which is characterized in that in a radial bearing portion formed by the outer circumferential surface of the shaft and an inner circumferential surface of the sleeve which are faced with each other, a groove or grooves capable of introducing fluid are formed on either one of the outer circumferential surface of the shaft and the inner circumferential surface of the sleeve; in a thrust bearing portion formed by the thrust surface of the sleeve and a thrust opposing surface fixed to one end of the shaft expanding toward outside in the radius direction, a releasing portion capable of discharging the introduced gas is formed at an outer periphery of the thrust bearing portion in the radius direction; and the thrust bearing portion is formed contiguous to the radial bearing portion.

Yet another aspect of the present invention relates to a hydrodynamic bearing, wherein the groove capable of introducing gas is a spiral groove inclined with respect to an axis of the hydrodynamic bearing.

Yet another aspect of the present invention relates to a hydrodynamic bearing wherein, the groove capable of introducing gas is a herringbone-shaped groove.

Yet another aspect of the present invention relates to a hydrodynamic bearing, wherein a groove-shaped asperity for generating a thrust hydrodynamic pressure is not formed on either surface which is faced with each other at the thrust bearing portion.

Yet another aspect of the present invention relates to a hydrodynamic bearing, wherein a ratio of surface area of the groove formed on either one of the surfaces opposed with each other at the radial bearing portion to the surface of the radial bearing portion which bears the groove is 40% or less.

Yet another aspect of the present invention relates to a hydrodynamic bearing, wherein the number of grooves formed in the radial bearing portion is six or smaller.

Yet another aspect of the present invention relates to a hydrodynamic bearing, wherein the shape of the groove formed in the radial bearing portion is asymmetric in such a manner that the depth in an upstream portion of an airflow which is the fore side in the direction of rotation is deep, and the depth in a downstream portion of the airflow which is the aft side in the direction of rotation is shallow.

Yet another aspect of the present invention relates to a hydrodynamic bearing, wherein either one or both of the shaft and the sleeve forming the bearing are made from ceramics.

Yet another aspect of the present invention relates to a hydrodynamic bearing, wherein the groove in the radial bearing portion for introducing fluid is formed on the outer circumferential surface of the shaft.

Still another aspect of the present invention relates to a spindle motor comprising any one of the hydrodynamic bearings described above.

EFFECTS OF THE INVENTION

In a bearing according to the present invention having a thrust bearing portion being connected with a radial bearing portion, application of a pressure at the thrust bearing portion is developed by means of fluid which is introduced through a groove or grooves in the radial bearing portion. Hence, it is not necessary to dispose a hydrodynamic pressure generation groove or grooves to the thrust bearing portion which is unless otherwise normally necessary. As a result, it is possible to reduce a production cost and obtain a hydrodynamic-pressure gas bearing having a simple structure. That is, since a groove or grooves in a spiral manner or in other shape are formed in the radial bearing portion, fluid which is introduced at the radial bearing portion as rotation occurs applies a pressure to the thrust bearing portion. As other end of the thrust bearing portion is opened to outside atmosphere, the thrust bearing portion as well functions as a bearing, which increases a load capacity of the thrust bearing portion. Further, since a pressure at the radial bearing portion also increases as a whole, the load capacity and the rigidity of the radial bearing portion increase as well at a high revolution range.

As a ratio of surface area of grooves to the bearing surfaces area is being limited to 40% or less, and as the number of the grooves is being limited to six or smaller, it is possible to more reliably obtain a radial-direction load capacity and a radial-direction rigidity.

A groove of the radial bearing portion has an asymmetrical cross section that is deeper in an upstream portion of an airflow (fore side in the direction of rotation), which leads to an improvement in stability in the radial direction (depression of half whirl) and lowering the revolution speed for lifting.

A spindle motor comprising the bearing according to the present invention may provide a spindle motor with a high bearing rigidity and an excellent reliability.

DETAILED DESCRIPTION OF THE PREFERRED EMBODIMENTS

Figure 1:
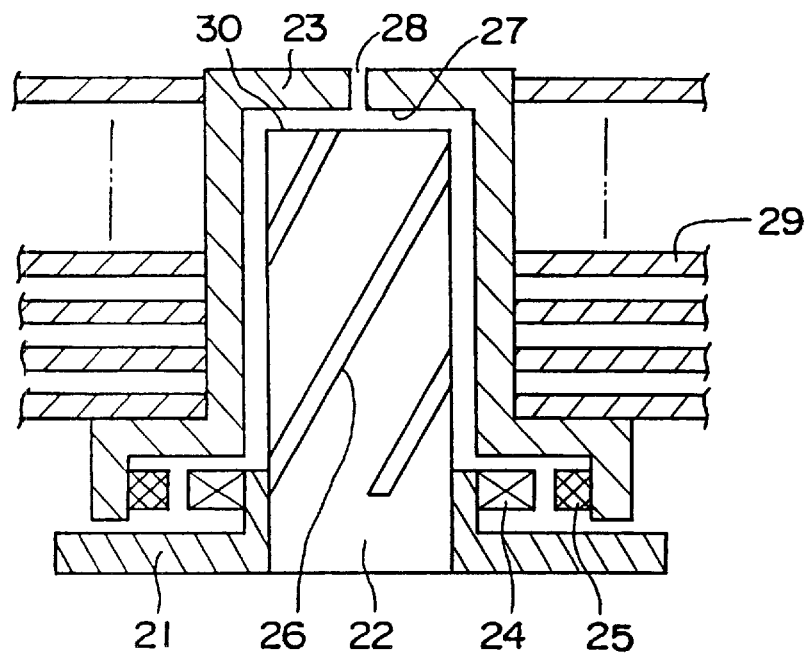
FIG. 1 is a cross sectional view of a hydrodynamic bearing according to a preferred embodiment of the present invention.

The first preferred embodiment of a hydrodynamic bearing according to of the present invention and a spindle motor which comprises the hydrodynamic bearing will now be described by referring to the associated drawing. FIG. 1 shows the hydrodynamic bearing according to the first preferred embodiment and the spindle motor comprising thereof. In FIG. 1, a column-like shaft 22 is fixed to a housing 21. A hollow cylindrical sleeve 23, whose one axial end is open and the other end is sealed by a blocked surface 27, is fitted on an outer circumferential surface of the shaft 22 such that the sleeve 23 freely rotates. A stator 24 is disposed radially to the housing 21 at a portion where the shaft 23 is fixed to the housing 21. The stator 24 is faced with a rotor magnet 25 which is attached to an inner circumferential surface of the sleeve 23. The blocked surface 27 of the sleeve 23 has an opening 28. FIG. 1 is an example of a spindle motor for a hard disk, in which a plurality of recording media 29 are mounted around the sleeve 23.

With respect to operations of the spindle motor and the hydrodynamic bearing structured as above, as a coil wound around the stator 24 is energized, attraction/repellance force is developed between the stator 24 and the rotor magnet 25, which in turn rotates the rotor magnet 25 and the sleeve 23 about the shaft 22. In the first preferred embodiment, the sleeve 23 rotates counter-clockwise as viewed from the top in FIG. 1. The rotation generates a radial hydrodynamic pressure at the radial bearing portion between the outer circumferential surface of the shaft 22 and the inner circumferential surface of the sleeve 23, and the sleeve 23 rotates in a non-contact condition between the two in a radial direction.

A groove or grooves 26 are formed in a spiral manner on the outer circumferential surface of the shaft 22. The spiral of the groove 26 is inclined in a direction toward the upper right-hand side of the top end portion 30 from the lower left-hand side of the shaft 22 on the front surface of FIG. 1, so that the groove runs upwardly with respect to the direction of rotation of the sleeve 23. Hence, as the sleeve 23 rotates counter-clockwise, fluid such as air introduced between shaft 22 and the sleeve 23 from the lower end of the axial direction in FIG. 1 is sequentially guided toward the upper right-hand side along the groove 26 due to the viscosity of the fluid. In the hydrodynamic bearing according to the present invention, the thrust bearing portion is arranged to be connected with the radial bearing portion. Therefore, the introduced fluid generates a pressure in the thrust bearing portion formed between the top end portion 30 of the shaft 22 and the blocked surface 27 of the sleeve 23, and the generated thrust pressure lifts up the sleeve 23. In consequence, the sleeve 23 rotates as it remains non-contact condition with the shaft 22.

As described above, the opening 28 is formed in the blocked surface 27 of the sleeve 23. Because of this, the fluid which generated the thrust pressure flows passed the opening 28 thereafter and is accordingly discharged to outside atmosphere. That is, the fluid introduced from the lower part of the bearing portion of the shaft 22 in FIG. 1 flows between the groove 26 and the inner circumferential surface of the sleeve 23 thereby guided toward above, arrives at the top end portion 30 of the shaft 22, generates the thrust pressure between the top end portion 30 and the blocked surface 27 of the sleeve 23 and thereafter passes through the opening 28 to be discharged, which series of functions are continuously exercised.

With the structure as described above, it is possible to generate a necessary thrust pressure between the top end portion 30 of the shaft 22 and the blocked surface 27 of the sleeve 23 without disposing any hydrodynamic pressure generation groove in that area. Further, as is clear from FIG. 1, it is possible to design in such a way that the length of the radial bearing portion formed by the shaft 22 and the sleeve 23 is sized longer than the diameter of the thrust bearing portion formed by the top end portion 30 of the shaft 22 and the blocked surface 27 of the sleeve 23. This allows that the groove 26 formed on the outer circumferential surface of the shaft 22 is longer than a groove formed in the thrust bearing portion. Hence, the pressure generated by the fluid introduced at the radial bearing portion and guided to the thrust bearing portion could be higher and, accordingly, a high thrust pressure may be obtained even in a low revolution range. That means, the thrust bearing portion can be lifted up and be separated in a lower revolution range to thereby allow an early transition to non-contact rotation, and therefore, it is possible to minimize contact friction between the elements forming the thrust bearing portion.

In the first preferred embodiment, the opening 28 formed in the blocked surface 27 of the sleeve 23 plays an important role. If the opening 28, namely, a fluid outlet is not disposed, as described in relation to a second preferred embodiment below, even though the sleeve 23 is lifted, the sleeve 23 drifts around because of a cushion effect induced by the fluid pressure, or in an extreme case, slips out from the shaft 22, whereby stable rotation is not achieved. With the opening 28 disposed, the fluid introduced at the groove of the radial bearing portion is discharged to outside atmosphere through it with a different resistance depending on whether the position of the sleeve 23 is high or low. That is, when the sleeve 23 is at a high position after being lifted and hence the gap at the radial bearing portion increases, the resistance decreases, and therefore, the fluid is easily discharged. The pressure accordingly drops down and lifting force then decreases. On the contrary, when the sleeve 23 is at a low position after descending, the resistance increases, and therefore, the pressure and the lifting force increase. By means of such a self-pressure adjusting effect of the radial bearing portion, a high thrust rigidity is obtained. To make the best use of such a self-pressure adjusting effect of the thrust bearing portion, it is preferable that no asperity of the spiral-shaped groove is formed which is normally formed for generating a thrust hydrodynamic pressure. If there is a groove-shaped asperity, an airflow is created even if the thrust bearing portion enters into contact, and the thrust rigidity is deteriorated. A groove-shaped asperity herein referred to is an asperity which serves as a passage for an airflow created at the thrust bearing portion with a depth of 1 μm or more, formed contiguously between a connecting portion with the radial bearing portion and the outside (which are the inner diameter side and the outer diameter side, respectively, in FIG. 1). More specifically, although a groove-shaped asperity herein referred to includes a spiral groove or a radial groove as normally formed in the thrust bearing portion, this does not include a concentric asperity. Of course, it is important that the parallelness of the two surfaces forming the thrust bearing portion (i.e., the squareness of the shaft and the sleeve, both in the thrust bearing portion and the radial bearing portion) is correctly maintained. The diameter of the opening 28 is 1 mm while the diameters of the shafts are 12 through 15 mm, according to the first and second practical examples shown below. However, based on the result of the experiments, the diameter of the opening 28 can have a considerably wide range of allowance.

Figure 2:
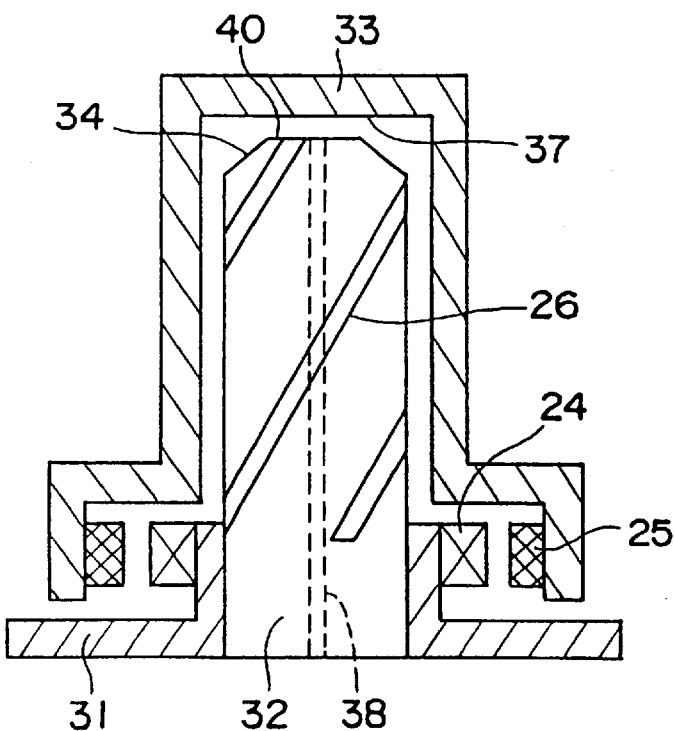
FIG. 2 is a cross sectional view of a hydrodynamic bearing according to another preferred embodiment of the present invention.

Now, the second preferred embodiment of a hydrodynamic bearing according to the present invention and a spindle motor comprising the hydrodynamic bearing will be described by referring to the associated drawing. FIG. 2 shows the hydrodynamic bearing according to the second preferred embodiment and the spindle motor comprising thereof. In each one of the following drawings, the like elements as those in precedent drawings will bear the like reference numerals. In FIG. 2, a shaft 32 is fixed to a housing 31, and a sleeve 33 is fitted on an outer circumferential surface of the shaft 32 such that the sleeve 33 freely rotates. A chamfered portion 34 is formed at the periphery of a top end portion 40 of the shaft 32. Further, according to the second preferred embodiment, a blocked surface 37 of the sleeve 33 does not comprise an opening. Instead, an a hole 38 is formed in the shaft 32.

With respect to operations of the spindle motor and the hydrodynamic bearing structured as described above, as in the case of the first preferred embodiment, rotational drive force is developed between the stator 24 and the rotor magnet 25, and the sleeve 33 rotates about the shaft 32. In the second preferred embodiment as well, the sleeve 33 rotates counter-clockwise as viewed from the top in FIG. 2. The rotation generates a radial hydrodynamic pressure at the radial bearing portion formed between the outer circumferential surface of the shaft 32 and an inner circumferential surface of the sleeve 33. In addition, because of the function of the groove 26 formed on the outer circumferential surface of the shaft 32, fluid such as air introduced at a lower part of the shaft 32 is guided between the top end portion 40 of the shaft 32 and the blocked surface 37 of the rotor hub 33, so that a thrust pressure is created between these two and the sleeve 33 accordingly rotates in a non-contact condition. The fluid which generated the thrust pressure is thereafter discharged to outside atmosphere through the hole 38 of the shaft 32. Such a function by means of the fluid is sequentially exercised.

The experiment conducted by the inventors of the present invention identified that the sensitivity of the influence by forming the chamfered portion 34 on the shaft 32 over the thrust bearing portion and the radial bearing portion is small. That is, it is not always necessary that the radial bearing portion and the thrust bearing portion are directly connected with each other. Even if a released portion such as the chamfered portion 34 is disposed, as far as the radial bearing portion and the thrust bearing portion are contiguous to each other as a consequence, it is possible to achieve a similar effect to where the radial bearing portion and the thrust bearing portion are directly connected with each other.

Further, the fluid may be released to outside from the sleeve side as described in relation to the first preferred embodiment, or alternatively, from the shaft side as in the second preferred embodiment. The release may be made through plurality of openings in the sleeve or plurality of holes in the shaft, or even mixture of the opening(s) and the hole(s). The release is preferably capable of adjusting a thrust pressure in accordance with a change in the size of a gap between the sleeve and the top end portion of the shaft.

Figure 3:
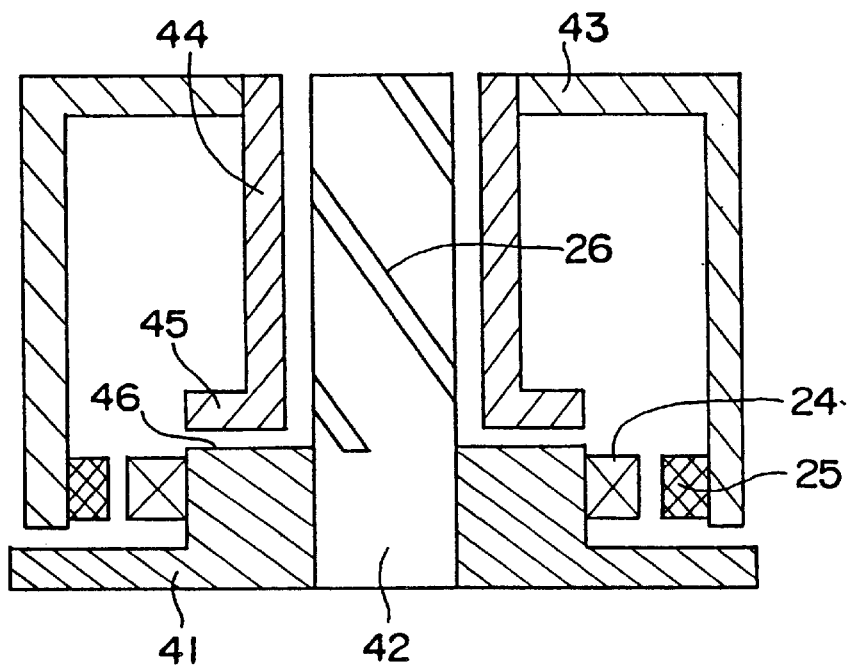
FIG. 3 is a cross sectional view of a hydrodynamic bearing according to yet another preferred embodiment of the present invention.

Now, the third of preferred embodiment of a hydrodynamic bearing according to the present invention and a spindle motor comprising the hydrodynamic bearing will be described by referring to the associated drawing. FIG. 3 shows the hydrodynamic bearing according to the third preferred embodiment and the spindle motor comprising thereof. In the third preferred embodiment, the inside of the thrust bearing portion is connected with the radial bearing portion. In FIG. 3, a shaft 42 is fixed to a housing 41, and a hollow cylindrical sleeve 44 is fitted on an outer circumferential surface of the shaft 42 such that the sleeve 44 freely rotates. A rotor 43 is fixed to one end of the sleeve 44. Further, a thrust plate 45 is disposed to the other end of the sleeve 44, and the thrust plate 45 is faced with a thrust opposing surface 46 of the housing 41.

With respect to operations of the spindle motor and the hydrodynamic bearing structured as described above, drive force is developed between the stator 24 which is radially disposed to the housing 41 and the rotor magnet 25 which is faced with the stator 24 and attached to an inner surface of the rotor 43, and the rotor 43 and the sleeve 44 rotate about the shaft 42. In the third preferred embodiment as well, the rotor 43 rotates counter-clockwise as viewed from the top in FIG. 3. The rotation generates a radial hydrodynamic pressure at the radial bearing portion formed between the outer circumferential surface of the shaft 42 and an inner circumferential surface of the sleeve 44, and the sleeve 44 and the rotor 43 rotate as they stay in non-contact condition with the shaft 42 in the radial direction.

The inclined groove or grooves 26 are formed on the outer circumferential surface of the shaft 42 such that the groove 26 extends diagonally toward below with respect to the direction of the rotation. Due to the function of the groove 26, fluid such as air introduced at an upper part of the shaft 42 in FIG. 3 is guided toward below after flowing between the groove 26 and the inner circumferential surface of the sleeve 44. The air thereafter reaches the thrust opposing surface 46 of the housing 41 which is a fixed portion of the shaft 42, and is then guided between the thrust opposing surface 46 and the thrust plate 45. The pressure of the fluid generated here lifts up the sleeve 44 and the rotor 43. This allows the rotor 43 to rotate as it stays in non-contact condition with the shaft 42. Following this, the fluid is discharged toward a releasing portion which is at an outer periphery of the thrust plate 45 in the radius direction in FIG. 3. Such a function by means of the fluid is sequentially exercised.

The fluid which generates the thrust pressure is sequentially supplied along the groove 26 of the shaft 42, and therefore, it is not necessary to form a groove or the like on the thrust plate 45 or the thrust opposing surface 46 of the housing 41 faced with the thrust plate 45 for generating the thrust hydrodynamic pressure. This allows to provide a thrust bearing with low cost.

Figure 4:
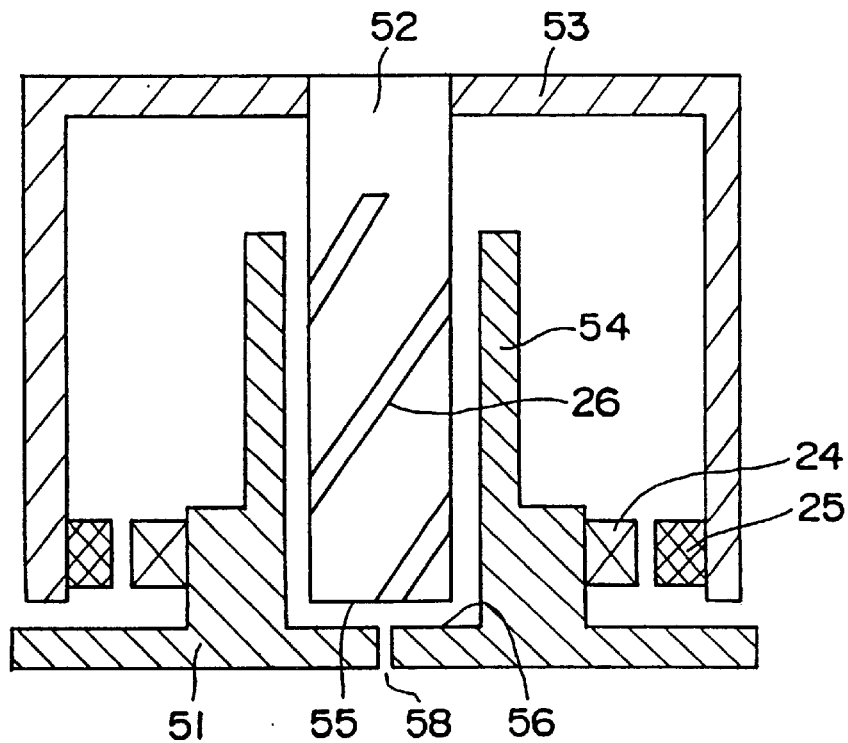
FIG. 4 is a cross sectional view of a hydrodynamic bearing according to yet another preferred embodiment of the present invention.

Now, the fourth preferred embodiment of a hydrodynamic bearing according to the present invention and a spindle motor which comprises the hydrodynamic bearing will be described by referring to the associated drawing. FIG. 4 shows the hydrodynamic bearing according to the fourth preferred embodiment and the spindle motor comprising thereof. The fourth preferred embodiment relates to a bearing structure wherein the shaft, rather than the sleeve, rotates. In FIG. 4, a shaft 52 is structured so as to rotate together with a rotor 53 as one unit. A sleeve 54 is fixed to a housing 51, and the shaft 52 is fitted in an inner circumferential surface of the sleeve 54 such that the shaft 52 freely rotates. An opening 58 is formed in a blocked surface 56 of the housing 51 which is faced with a bottom end surface 55 of the shaft 52, to thereby discharge fluid such as air through it.

With respect to operations of the spindle motor and the hydrodynamic bearing structured as described above, drive force is developed between the stator 24 which is radially disposed to the sleeve 54 and the rotor magnet 25 which is faced with the stator 24 and attached to an inner surface of the rotor 53, and the rotor 53 and the shaft 52 rotate about the sleeve 54. In the fourth preferred embodiment as well, the rotor 53 rotates counter-clockwise as viewed from the top in FIG. 4. The rotation generates a radial hydrodynamic pressure at the radial bearing portion formed between the outer circumferential surface of the shaft 52 and the inner circumferential surface of the sleeve 54, and the shaft 52 rotates as it stays in non-contact condition with the sleeve 54 in the radial direction.

A inclined groove or grooves 26 are formed in the outer circumferential surface of the shaft 52 such that the groove 26 extends diagonally toward below with respect to the direction of the rotation. Because of this, as the shaft 52 rotates, fluid is introduced at an upper part of the shaft 52 in FIG. 4. The fluid is thereafter guided toward below in FIG. 4 after flowing between the groove 26 and the inner circumferential surface of the sleeve 54, arriving at the thrust bearing portion formed between the bottom end surface 55 of the shaft 52 and the blocked surface 56 of the housing 51. A pressure developed by the compressed fluid at the thrust bearing portion lifts up the shaft 52, and the shaft 52 and the rotor 53 rotate as they stay in non-contact condition with the blocked surface 56. Following this, the fluid which generated the thrust pressure is discharged to outside atmosphere through the opening 58 formed in the blocked surface 56 of the housing 51. Such a function by means of the fluid is sequentially exercised.

The fluid which generates the thrust pressure is sequentially supplied along the groove 26 of the shaft 52, and therefore, it is not necessary to form a groove or the like, in the bottom end surface 55 of the thrust bearing portion or the blocked surface 56 of the housing 51 faced with the bottom end surface 55, for generating the thrust pressure. This allows to provide a thrust bearing with low cost.

While the fluid is released at the opening 58 formed in the housing 51 in FIG. 4, a hole may be formed in the shaft 52 to thereby release the fluid as in the second preferred embodiment.

Figure 5:
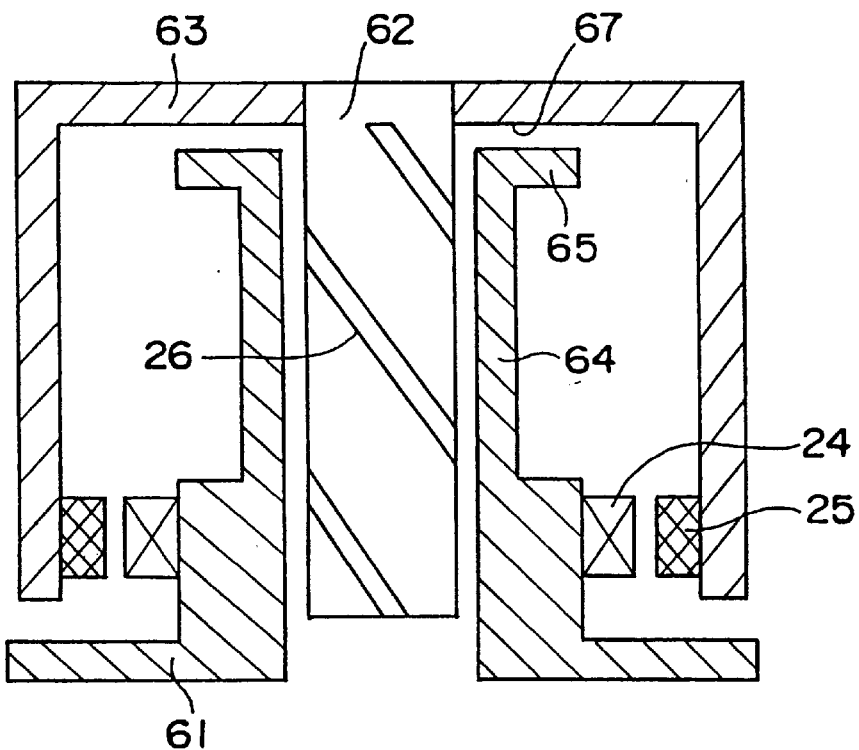
FIG. 5 is a cross sectional view of a hydrodynamic bearing according to still other preferred embodiment of the present invention.

Now, the fifth preferred embodiment of a hydrodynamic bearing according to the present invention and a spindle motor which comprises the hydrodynamic bearing will be described by referring to the associated drawing. FIG. 5 shows the hydrodynamic bearing according to the fifth preferred embodiment and the spindle motor comprising thereof. The fifth preferred embodiment relates to a hydrodynamic bearing of such a type that the shaft rotates and the internal side of the thrust bearing portion is connected with the radial bearing portion. In FIG. 5, a shaft 62 is structured so as to rotate together with a rotor 63 as one unit. The shaft 62 is fitted in an inner circumferential surface of a sleeve 64 which is fixed to a housing 61 such that the shaft 62 freely rotates. A thrust plate 65 is disposed to the sleeve 64, and is faced with a thrust opposing surface 67 disposed to the rotor 63.

With respect to operations of the spindle motor and the hydrodynamic bearing structured as described above, drive force is developed between the stator 24 which is radially disposed to the housing 61 and the rotor magnet 25 which is faced with the stator 24 and attached to an inner surface of the rotor 63, and the rotor 63 and the shaft 62 rotate about the sleeve 64. In the fifth preferred embodiment as well, the rotor 63 rotates counter-clockwise as viewed from the top in FIG. 5. The rotation generates a radial hydrodynamic pressure at the radial bearing portion formed between the outer circumferential surface of the shaft 62 and the inner circumferential surface of the sleeve 64, and the shaft 62 rotates as it stays in non-contact condition with the sleeve 64 in the radial direction.

The inclined groove or grooves 26 are formed on the outer circumferential surface of the shaft 62 such that the groove 26 extends diagonally toward above with respect to the direction of the rotation. Because of this, fluid is introduced at a lower part of the shaft 62 in FIG. 5. The fluid is thereafter guided toward above in FIG. 5 after flowing between the groove 26 and the inner circumferential surface of the sleeve 64, arriving at the thrust opposing surface 67 of the rotor 63 and hence the thrust bearing portion between the thrust plate 65 and the thrust opposing surface 67. The rotor 63 and the shaft 62 are lifted up by a pressure of the fluid compressed at the thrust bearing portion, and rotate as they stay in non-contact condition.

Following this, the fluid is discharged from a releasing portion which is at an outer periphery of the thrust plate 65 in the radius direction in FIG. 5. Such a function by means of the fluid is sequentially exercised.

The fluid which generates the thrust pressure is sequentially supplied along the groove 26 of the shaft 62, and therefore, it is not necessary to form a groove or the like, on the thrust plate 65 or the thrust opposing surface 67 of the rotor 63 faced with the thrust plate 65, for generating the thrust hydrodynamic pressure. This allows to provide a thrust bearing with low cost.

Now, the sixth preferred embodiment of a hydrodynamic bearing according to the present invention will be described by referring to the associated drawing. The sixth preferred embodiment relates to a groove to be formed on an outer circumferential surface of a shaft to introduce fluid. In accordance with rotation, the groove serves to apply a pressure to a thrust bearing portion connected with a radial bearing portion, and to enhance the load capacity of the thrust bearing portion. Further, since a pressure at the radial bearing portion connected with the thrust bearing portion is raised as a whole as the thrust bearing portion is subjected to a pressure, it is possible to improve the load capacity and the rigidity of the radial bearing portion as well at a high revolution range.

Namely, the hydrodynamic bearing according to this preferred embodiment is structured in that one end of the thrust bearing portion is disposed contiguous to the radial bearing portion and other end of the thrust bearing portion is open to outside so that the thrust bearing portion functions as a bearing as well and the rigidity is accordingly enhanced. Since the thrust bearing portion is subjected to a pressure by means of an air introduced by a groove in the radial bearing portion, it is not necessary to form a spiral groove for generating a hydrodynamic pressure at the thrust bearing portion which is unless otherwise needed. This permits manufacturing cost reduction. A spiral groove of the thrust bearing portion is in many cases formed by etching or laser graving, and therefore, inevitably requires a high cost. On the contrary, a spiral groove in the radial bearing portion may be formed inexpensively, for example by grinding a shaft component while rotating the shaft or by other appropriately processing as is described later, and accordingly cost reduction may be achieved.

As described earlier, it is required for the radial bearing portion to exert a load capacity and a rigidity in the radial direction. Forming the groove or grooves as described above in the radial bearing portion does not directly contribute to an improvement in load capacity and rigidity at the radial bearing portion, since an airflow in the radial bearing portion becomes discontinuous due to the groove. Because of this, despite the necessity of introduction air to the thrust bearing portion, a ratio of the surface allocated to the groove in the radial bearing portion is preferably limited to a certain level or lower. According to a experiment conducted by the inventors of the present invention, it becomes apparent that it is desirable that a ratio of the surface area for the groove to the surface area of the shaft forming the bearing is limited to 40% or smaller. In addition, for the same reason, the number of the grooves is preferably limited to six or less.

According to the preferred embodiments described heretofore, the groove is inclined in the form of spiral with respect to the axis of the bearing in each drawing. In the present invention, a primary object of forming this groove is to guide fluid to the thrust bearing portion which is contiguous with the radial bearing portion. Hence, to the extent it is possible to guide air to the thrust bearing portion, the groove may not necessarily be a spiral-shaped groove. As an example, the groove may have a herringbone-shape, etc., rather than a spiral shape. An experiment conducted by the inventors of the present invention identified that even a groove which is parallel to the axis of the bearing (i.e., a groove whose angle of twist is 0 degree) achieves the effect to a certain degree (See practical example 1 shown below.). In the case of a shaft with no groove, however, the effect of the present invention was not obtained.

Now, the seventh preferred embodiment of a hydrodynamic bearing according to the present invention will be described. The seventh preferred embodiment, same as the sixth preferred embodiment, relates to a groove formed in a radial bearing portion. A primary object of forming this groove is to guide air to a thrust bearing portion through the radial bearing portion which is contiguous to the thrust bearing portion, as described above. Hence, the groove preferably has such a shape that may realizes efficient introduction and feeding of air to meet the object, and may contribute to generate a hydrodynamic pressure at the radial bearing portion or at least may not create any adverse effect to generation of a hydrodynamic pressure in the radial bearing portion. A second object of forming this groove is to improve the stability of the radial bearing portion. With the groove disposed, it is possible to depress a half whirl behavior (phenomenon of vibration at half the cycle of the revolution number) during high speed rotation. Further, it is also necessary to consider to lift the rotor at as low revolution speed as possible after starting the rotation.

According to a experiment conducted by the inventors of the present invention from these perspectives, it is preferable that the groove formed in the radial bearing portion has a shape with asymmetric cross section. That is, the cross sectional depth in an upstream portion of an airflow (fore side in the direction of rotation) is deep, and the depth in a downstream portion (lower side in the direction of rotation) is shallow. By forming the groove in such a shape, it was recognized that the stability in the radial direction was improved (i.e., half whirl was depressed), and that an effect of pressure application to the thrust bearing portion was promoted whereby the lifting revolution speed of rotor was lowered.

Figure 6:
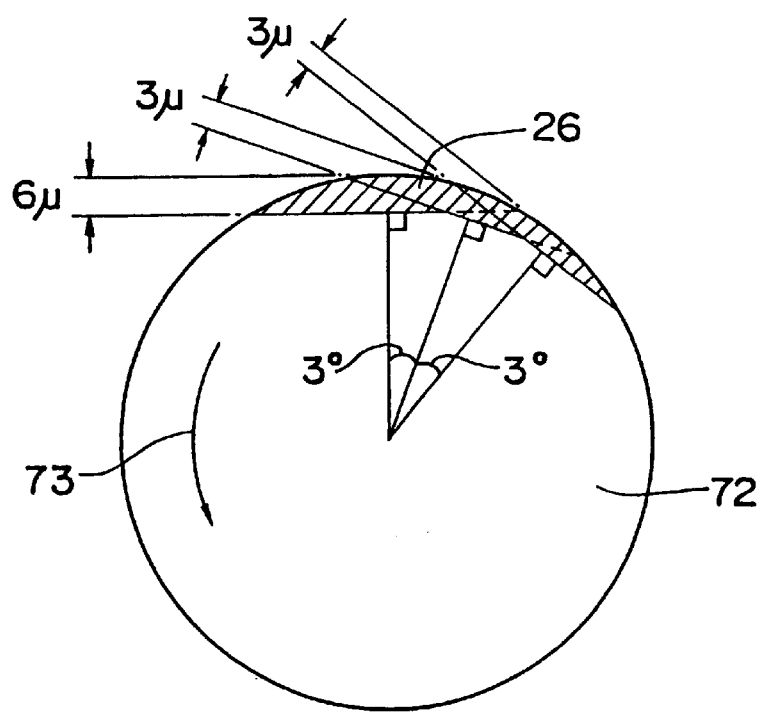
FIG. 6 is a schematic diagram of a groove which is formed on a shaft of the hydrodynamic bearing according to the still other preferred embodiment of the present invention.
Figure 7:
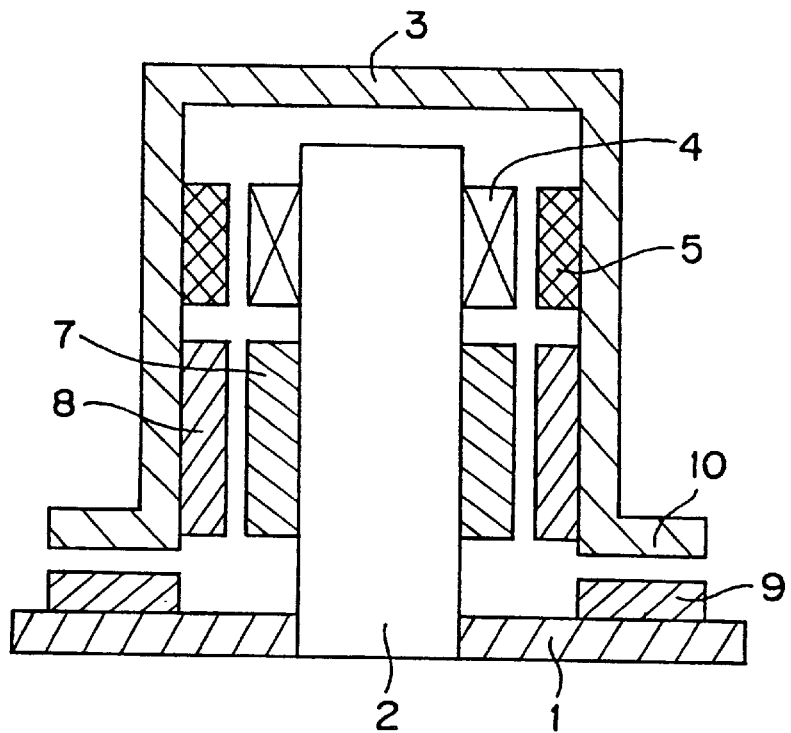
FIG. 7 is a cross sectional view of a hydrodynamic bearing of the prior art.
Figure 8:
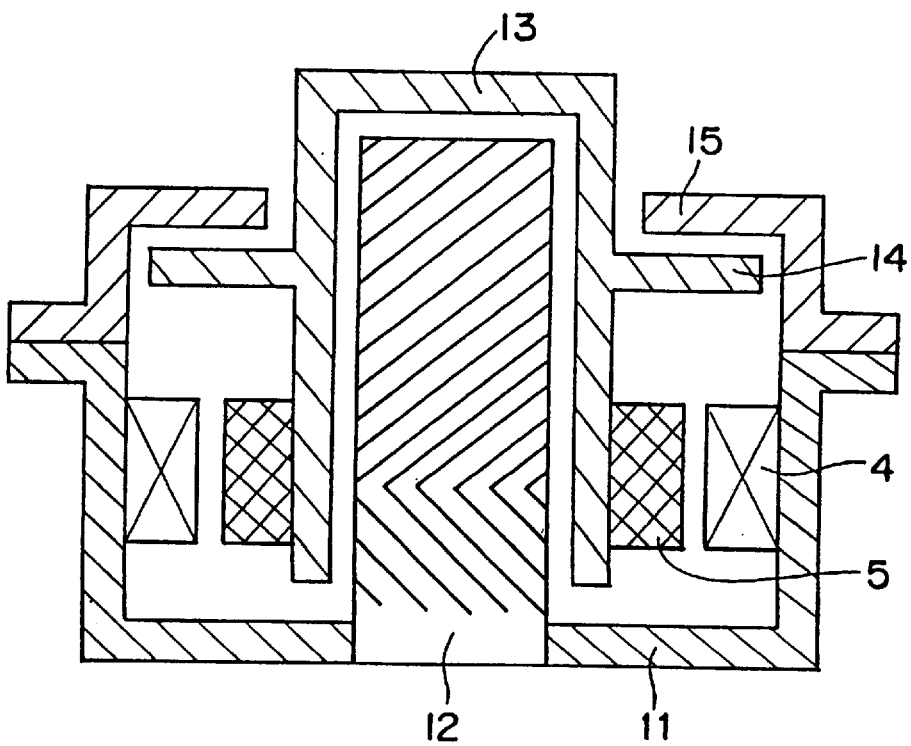
FIG. 8 is a cross sectional view of another hydrodynamic bearing of the prior art.

FIG. 6 shows an example of such an asymmetric groove. Illustrated in FIG. 6 is a cross section of the shaft 72 and a cross section of the groove 26 which is formed on the outer circumferential surface of the shaft. Denoted by the arrow 73 is the direction of rotation in which the shaft 72 rotates. The groove 26 is ground 6 $\mu$m, 3 $\mu$m and 3 $\mu$m, each with an angular difference of 3 degrees, respectively, in this order from the upper side in the direction of rotation. This groove 26 is the same as the one used in the practical example 1 to be described later. FIG. 6 is a schematic diagram exaggerating the area of the groove 26 in its dimensions, angles and the ratios to the outer periphery. In addition, the groove 26 may be formed by other methods such as etching or laser processing etc., instead of grinding.

In the foregoing, a hydrodynamic pressure is generated by means of introduction of fluid such as air. The fluid herein referred to includes other gases, such as inert gas or nitrogen gas to operate the spindle motor in a particular atmosphere. The fluid herein referred to also includes liquid such as oil. As liquid such as oil is incompressible, the compression effect described above is not obtainable where the fluid is liquid. Nevertheless, liquid can realize a comparable effect when pressurized.

Further, in each one of the preferred embodiments described in the above, the groove in the radial bearing portion is formed on the outer circumferential surface of the shaft, which is easier for processing. However, the present invention is not limited to this. Even when the groove is formed on the inner circumferential surface of the sleeve faced with the outer circumferential surface of the shaft at the radial bearing portion, it is possible to obtain similar effects.

Further, it is desirable to improve the rigidity and the durability of the bearing by using either one or both of the shaft and the sleeve made from ceramics material. However, the present invention is not limited to an application of the shaft or the sleeve of ceramics.

In the following, practical examples conducted by the inventors of the present invention will be described. These examples are described for explanation purposes only.

Practical Example 1

A bearing was fabricated in accordance with the structure shown in FIG. 1 comprising: a radial bearing portion with a shaft diameter 15 mm, an effective length of the bearing portion 12 mm, and an average gap 1.5 $\mu$m; and a thrust bearing portion with an outer diameter 15 mm, and an inner diameter (diameter of the opening) 1 mm. Three grooves were formed in the radial bearing portion in a spiral manner, each of which was formed by grinding into a depth of 6 $\mu$m first, thereafter rotating the shaft by 3 degrees toward the lower side of the direction of rotation and then grinding into a depth of 3 $\mu$m, and further rotating the shaft by 3 degrees in the same direction and then grinding into a depth of 3 $\mu$m (6-3-3 grooves), in such a manner that the circumferential twisting angle formed by inclination of the groove between the two end surfaces of the shaft was 20 degrees. FIG. 6 shows a cross section of the shaft as it bears one such groove. When the bearing was in rotation at 10,000 rpm, the load capacity in the thrust direction was 1.5 N and the rigidity was 0.8 N/$\mu$m with lifting space of 2 $\mu$m.

As a comparative example, the three 6-3-3 grooves described above were formed at a circumferential twisting angle of 0 degree (i.e., parallel to the axis of the bearing). Under the same condition, the load capacity was 0.3 N and the rigidity was 0.1 N/$\mu$m. Further, when the shaft with no groove was used, the load capacity and the rigidity were both too small to be measured.

Practical Example 2

A bearing was fabricated in accordance with the structure shown in FIG. 1 comprising: a radial bearing portion with a shaft diameter 12 mm, an effective length of the bearing portion 10 mm, and an average gap 2.0 μm; and a thrust bearing portion with an outer diameter 12 mm, and an inner diameter (diameter of the opening) 1 mm. Three grooves were formed in the radial bearing portion in a spiral manner, each of which was formed by grinding into a depth of 4 μm first, thereafter rotating the shaft by 2 degrees and then grinding into a depth of 1 μm, and further rotating the shaft by 2 degrees and then grinding into a depth of 1 μm (4-1-1 grooves), in such a manner that the circumferential twisting angle of the groove between the two end surfaces of the shaft was 10 degrees. When the bearing was in rotation at 15,000 rpm, the load capacity in the thrust direction was 0.4 N and the rigidity was 0.2 N/μm with lifting space of 2 μm.

As for the bearing with no opening (hole) for releasing air compressed in the thrust bearing portion, although the load capacity was recognized by 1 N or larger, the position of the thrust direction was not stable and the rigidity was too small to be measured.

What is claimed is:

1. A hydrodynamic bearing comprising a radial bearing portion and a thrust bearing portion having a groove or grooves capable of introducing fluid formed on either one of surfaces opposed with each other at said radial bearing portion, wherein the shape of said groove formed in said racial bearing portion is asymmetric in such a manner that the depth in an upstream portion of an airflow which is the fore side in the direction of rotation is deeper than the depth in a downstream portion of the airflow which is the aft side in the direction of rotation.

2. A hydrodynamic bearing of claim 1, wherein one end of said thrust bearing portion is connected with said radial bearing portion, and the other end of said thrust bearing portion is open to the outside atmosphere.

3. A hydrodynamic bearing of claim 2, wherein said groove or grooves exert a function of guiding the fluid introduced at said radial bearing portion to said thrust bearing portion connected with said radial bearing portion.

4. A hydrodynamic bearing of claim 3, wherein said groove or grooves are either spiral grooves inclined with respect to an axis of said hydrodynamic bearing or herringbone-shaped grooves.

5. A hydrodynamic bearing having a column-like shaft and a hollow cylindrical sleeve whose one end is open and other end has a blocked surface, which sleeve is fitted on an outer circumferential surface of said shaft so as to accomplish relative rotation among the two, said hydrodynamic bearing further comprising:
a groove or grooves capable of introducing fluid formed on either one of the outer circumferential surface of said shaft and the inner circumferential surface of said sleeve in a radial bearing portion formed by the two, and at least one opening capable of discharging said introduced fluid to outside atmosphere formed either in said shaft or said sleeve in a thrust bearing portion formed by one end surface of said shaft in the axial direction and said blocked surface of said sleeve which are faced with each other, which thrust bearing portion is formed contiguous to said radial bearing portion, wherein the shape of said groove or grooves formed in said radial bearing portion are asymmetric in such a manner that the depth in an upstream portion of an airflow which is the fore side in the direction of rotation is deeper than the depth in a downstream portion of the airflow which is the aft side in the direction of rotation.

6. A hydrodynamic bearing of claim 5, wherein said groove or grooves are either spiral grooves inclined with respect to an axis of said hydrodynamic bearing or herringbone-shaped grooves.

7. A hydrodynamic bearing of claim 5, wherein no groove-shaped asperity for generating a thrust hydrodynamic pressure is formed on both surfaces which are faced with each other at said thrust bearing portion.

8. A hydrodynamic bearing of claim 5, wherein a ratio of surface area of said groove or grooves formed on either one of the surfaces opposed with each other at said radial bearing portion to the surface area of said radial bearing portion which bears said groove or grooves is 40% or less.

9. A hydrodynamic bearing of claim 5, wherein the number of grooves formed in said radial bearing portion is six or smaller.

10. A hydrodynamic bearing of claim 5, wherein either one or both of said shaft and said sleeve forming said bearing are made from ceramics.

11. A spindle motor comprising the hydrodynamic bearing of claim 5.

12. A hydrodynamic bearing of claim 5, wherein said groove or grooves in said radial bearing portion for introducing fluid are formed on the outer circumferential surface of said shaft.

13. A hydrodynamic bearing of claim 12, wherein said groove or grooves (26) are formed by grinding.

14. A hydrodynamic bearing of claim 13, wherein said groove or grooves (26) are formed by grinding an upstream portion of an airflow which is the fore side in the direction of rotation deep, and grinding a downstream portion of the airflow which is the aft side in the direction of rotation shallow relative to said upstream portion.

15. A hydrodynamic bearing comprising:
a column-like shaft; and
a hollow cylindrical sleeve whose one end is open and other end has a thrust surface which expands toward outside in the radius direction, which sleeve is fitted on an outer circumferential surface of said shaft so as to accomplish relative rotation among the two, characterized in that in a radial bearing portion formed by the outer circumferential surface of said shaft and an inner circumferential surface of said sleeve which are faced with each other, a groove or grooves capable of introducing fluid are formed on either one of the outer circumferential surface of said shaft and the inner circumferential surface of said sleeve, said hydrodynamic bearing further characterized in that in a thrust bearing portion formed by said thrust surface of said sleeve and a thrust opposing surface, fixed to one end of said shaft expanding toward outside in the radius direction, a releasing portion capable of discharging said introduced gas is formed at an outer periphery of said thrust bearing portion in the radius direction, which thrust bearing portion is formed contiguous to said radial bearing portion.

16. A hydrodynamic bearing of claim 15, wherein said groove or grooves are either spiral grooves inclined with respect to an axis of said hydrodynamic bearing or herringbone-shaped grooves.

17. A hydrodynamic bearing of claim 15, wherein no groove-shaped asperity for generating a thrust hydrodynamic pressure is formed on both surfaces which are faced with each other at said thrust bearing portion.

18. A hydrodynamic bearing of claim 15, wherein a ratio of surface area of said groove for grooves formed on either one of the surfaces opposed with each other at said radial bearing portion to the surface area of said radial bearing portion which bears said groove or grooves is 40% or less.

19. A hydrodynamic bearing of claim 15, wherein the number of grooves formed in said radial bearing portion is six or smaller.

20. A hydrodynamic bearing of claim 15, wherein the shape of said groove or grooves formed in said radial bearing portion are asymmetric in such a manner that the depth in an upstream portion of an airflow which is the fore side in the direction of rotation is deep and the depth in a downstream portion of the airflow which is the aft side in the direction of rotation is shallow.

21. A hydrodynamic bearing of claim 15, wherein either one or both of said shaft and said sleeve forming said bearing are made from ceramics.

22. A hydrodynamic bearing of claim 15, wherein said groove or grooves in said radial bearing portion for introducing fluid are formed on the outer circumferential surface of said shaft.

23. A spindle motor comprising the hydrodynamic bearing of claim 15.

* * * * *